United States Patent [19]

Fye

[11] Patent Number: 5,537,634
[45] Date of Patent: Jul. 16, 1996

[54] SUBCARRIER-MULTIPLEXED OPTICAL TRANSMISSION SYSTEMS USING OPTICAL CHANNEL SELECTION

[75] Inventor: Donald M. Fye, Wayland, Mass.

[73] Assignee: GTE Laboratories Incorporated, Waltham, Mass.

[21] Appl. No.: 833,574

[22] Filed: Feb. 10, 1992

Related U.S. Application Data

[63] Continuation of Ser. No. 126,811, Nov. 30, 1987.

[51] Int. Cl.$^6$ .................................................. H04J 14/02
[52] U.S. Cl. .......................................... 359/124; 359/154
[58] Field of Search ................................. 359/124, 125, 359/132, 133, 157, 154

[56] References Cited

U.S. PATENT DOCUMENTS

| | | | |
|---|---|---|---|
| 4,228,349 | 10/1980 | Ettenberg et al. | 370/3 |
| 4,359,776 | 11/1982 | Acket et al. | 372/46 |
| 4,592,043 | 5/1986 | Williams | 370/3 |
| 4,722,081 | 1/1988 | Fujito et al. | 370/3 |

FOREIGN PATENT DOCUMENTS

| | | |
|---|---|---|
| 58-111449 | 9/1983 | Japan . |
| 58-197930 | 2/1984 | Japan . |

OTHER PUBLICATIONS

Darcie, "Subcarrier multiplexing for lightwave multiple access networks," Proc. on 6th Intl. Conf. on IO and OFC, vol. 3, Paper M13 (Jan. 1987).

Olsson et al., "High sensitivity direct-detection . . . preamplifier," Elect. Letters, vol. 22, NO. 21, pp. 1114–1116 (Oct. 9, 1986).

Kawaguchi et al., "Experimental verification . . . DFB–type LD Amplifier," Proc. of 6th Intl. Conf. on IO and OFC, vol. 3, Paper THC5 (Jan. 1987).

*Primary Examiner*—Leo Boudreau
*Assistant Examiner*—K. Negash
*Attorney, Agent, or Firm*—James J. Cannon, Jr.; Victor F. Lohmann, III

[57] ABSTRACT

A tunable optical amplifier is used as a wavelength-selective high-gain element in a subcarrier-multiplexed fiber optic transmission system for providing a direct optical domain-to-baseband conversion of a selected optical channel. A high-speed diode laser optical transmitter is modulated by a plurality of independent information channels that are carried on separate, appropriately spaced carrier frequencies. An optical receiver, coupled to the transmitter by way of an optical fiber, includes a tunable narrow-bandpass semiconductor laser optical amplifier having a gain bandwidth smaller than wavelength distances between adjacent ones of the carrier frequencies, a photodetector coupled to the output of the amplifier, and polarization controlling means coupled to the fiber in front of the optical amplifier for maximizing gain in the optical amplifier. The optical amplifier is tuned to a selected one of the subcarrier-multiplexed optical channels so that the photodetector provides only the baseband signal present in the selected optical channel.

2 Claims, 5 Drawing Sheets

SUBCARRIER-MULTIPLEXED OPTICAL TRANSMISSION SYSTEMS USING OPTICAL CHANNEL SELECTION

This is a continuation of copending application Ser. No. 07/126,811 filed on Nov. 30, 1987.

BACKGROUND OF THE INVENTION

1. Field of the Invention

This invention relates to subcarrier-multiplexed optical transmission systems, and especially to those using optical channel selection. Accordingly, it is a general object of this invention to provide new and improved systems of such character.

2. General Background

The pertinence of the following references of interest will become more apparent from a reading of the specification.

REFERENCES

1. L. Kazovsky, "Multichannel coherent optical communications systems", in *Technical Digest, OFC/IOOC '87*, Reno, paper TUG1 (1987).

2. H. Toba, K. Inoue and K. Nosu, "A Conceptual Design on optical Frequency-Division-Multiplexing Distribution Systems With Optical Tunable Filters", *IEEE J. Selected Areas in Communications*, vol. SAC-4, No. 9, pp. 1459–1467, 1986. (hereinafter Toba et al.)

3. T. Darcie, "Subcarrier multiplexing for lightwave multiple-access networks", in *Technical Digest, OFC/IOOC '87*, Reno, paper M13, 1987.

4. J. C. Simon, "Semiconductor laser amplifier for single mode optical fiber communications", *J. Optical Comm.*, vol. 4, no. 2, 1983.

5. H. Kawaguchi et al., "Experimental verification of optical demultiplexing using a DFB-type LD amplifier", in *Technical Digest, OFC/IOOC '87*, Reno, paper THC5 (1987).

6. T. Mukai and Y. Yamamoto, "Gain, Frequency Bandwidth, and Saturation Output Power of AlGaAs DH Laser Amplifiers", *IEEE J. Quantum Electron.*, vol. QE-17, no. 6, pp. 1028–1034, 1981 (hereinafter Mukai et al.).

7. R. Olshansky et al., "Frequency Response of 18 GHz Vapor Phase Regrown BH Lasers", in *Technical Digest, Tenth IEEE International Semiconductor Laser Conference*, Kanazawa, Japan, paper M-2, 1986.

8. H. C. Lefevre, "Single-mode fiber fractional wave devices and polarization controllers", *Electron. Lett.*, vol. 16, pp. 778–780, 1980.

9. N. A. Olsson and P. Garbinski, "High-Sensitivity Direct-Detection Receiver with a 1.5 μm Optical Preamplifier", *Electron. Lett.*, vol. 22, pp. 1114–1116, 1986 (hereinafter Olsson et al.).

10. D. M. Fye, "Practical Limitations on Optical Amplifier Performance", *IEEE J. Lightwave Tech.*, vol. LT-2, no. 4, pp. 403–406, 1984.

11. T. Saitoh and T. Mukai, "Low-Noise 1.5 μm GaInAsP Traveling-Wave Optical Amplifier with High-Saturation Output Power", in *Technical Digest of Post-Deadline Papers, Tenth IEEE International Semiconductor Laser Conference*, Kanazawa, Japan, 1986 (hereinafter Saitoh et al.).

12. Application manual for Fabry-Perot Interferometers and Etalons, available from Burleigh Instruments, Inc., Burleigh Park, Fishers, N.Y. 14453.

Figure 1A:
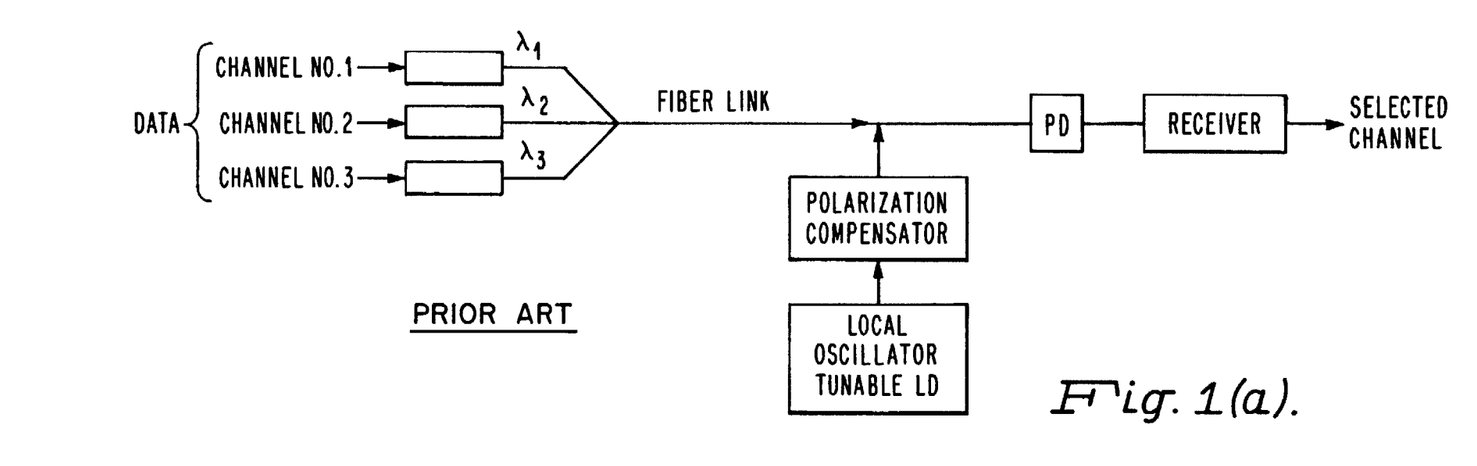
FIG. 1(a) is a block diagram of a multichannel coherent transmission system of the prior art.
Figure 1B:
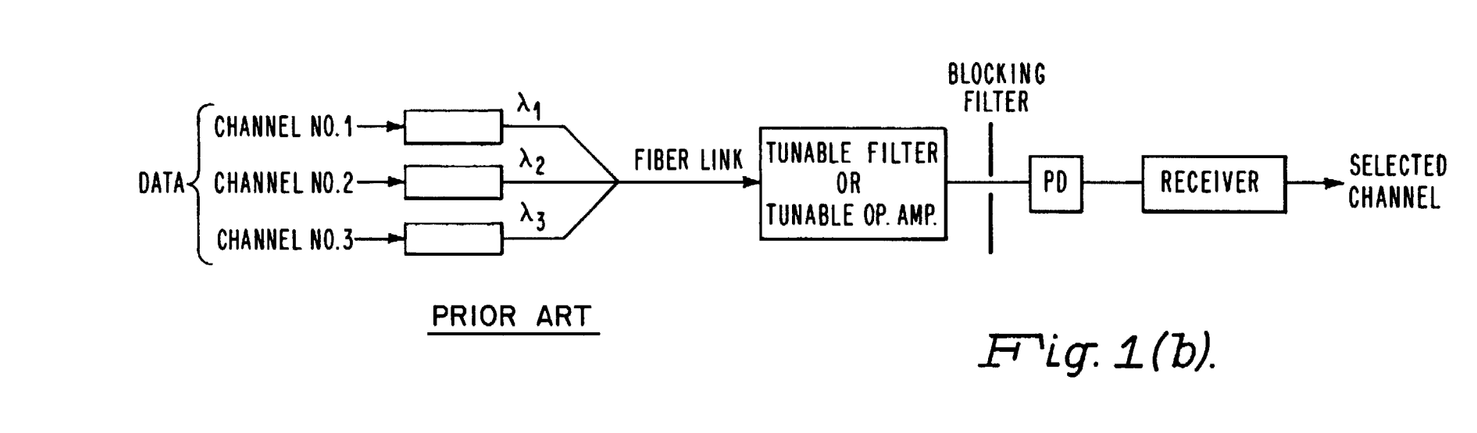
FIG. 1(b) is a block diagram of a tunable wavelength division multiplex transmission system of the prior art.
Figure 1C:
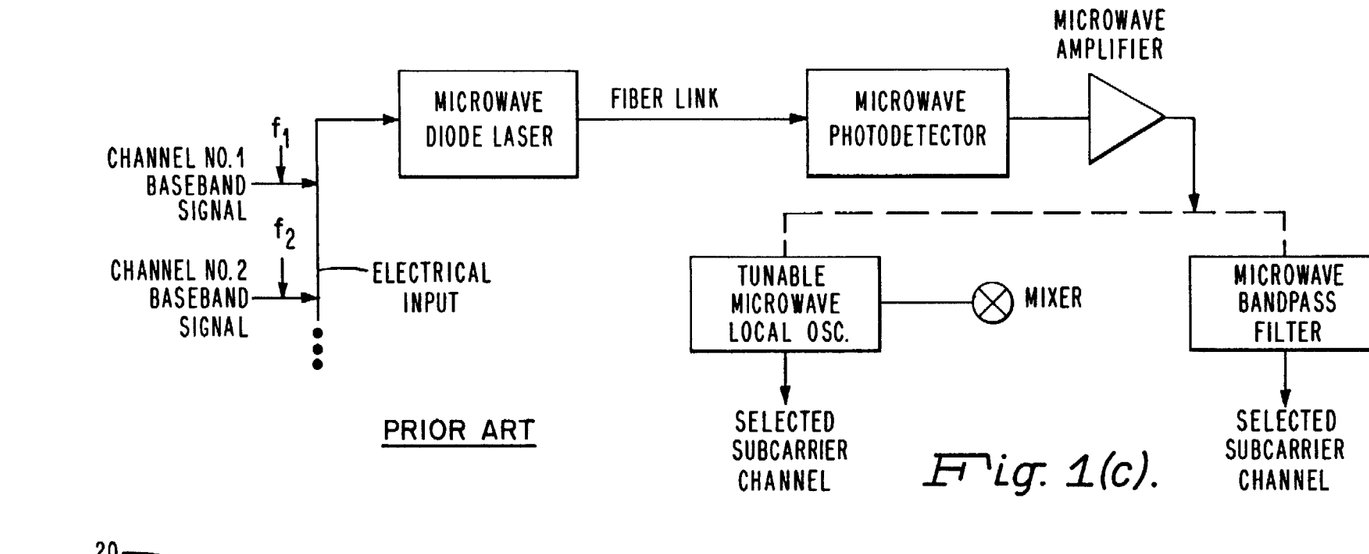
FIG. 1(c) is a block diagram of a subcarrier multiplexed optical transmission system with electronic channel selection of the prior art.

The large bandwidth capacity of optical fiber makes it possible to provide greatly expanded communication services in the subscriber loop. Multichannel coherent transmission (Kazovsky, supra), wavelength-division multiplexing (Toba et al., supra), and subcarrier multiplexing (Darcie, supra) are known techniques for transmitting a number of independent information channels on a single optical fiber. Schematic representations of systems using each of these transmission techniques are shown in FIG. 1, and Table I summarizes the advantages and disadvantages of each technique.

TABLE I

ADVANTAGES AND DISADVANTAGES OF MULTI-CHANNEL OPTICAL TRANSMISSION TECHNIQUES FOR SUBSCRIBER LOOP APPLICATIONS

| TECHNIQUE | ADVANTAGES | DISADVANTAGES |
|---|---|---|
| 1. Multichannel Coherent Transmission | Highest receiver sensitivity Narrowest channel spacing | Requires narrow linewidth single-longitudinal-mode diode lasers for transmitter and local oscillator Present concepts call for one transmitter laser for each information channel Requires precise control of transmitter and local oscillator laser wavelengths Difficult to maintain channel spacing between multiple lasers |
| 2. Wavelength Division Multiplexing | Does not require narrow-linewidth lasers Does not require local oscillator laser in receiver Close channel spacing possible with tunable optical filter or narrowband optical amplifier Very simple for systems with few widely-spaced channels | Present concepts call for one transmitter laser for each information channel Difficult to maintain wavelength spacing between multiple lasers |
| 3. Subcarrier Multiplexing with Electronic Channel Selection | More than one information channel transmitted by each diode laser Relative channel spacings fixed electronically - no laser wavelength stability requirement No local oscillator laser required for receiver | Requires high-bandwidth photodiode and microwave amplifier in receiver Requires microwave bandpass filter or microwave local oscillator for channel selection Receiver sensitivity lower than that of baseband direct detection Requires diode laser transmitter with high modulation bandwidth Useable optical modulation depth of transmitter laser limited by |

TABLE I-continued

ADVANTAGES AND DISADVANTAGES OF MULTI-CHANNEL OPTICAL TRANSMISSION TECHNIQUES FOR SUBSCRIBER LOOP APPLICATIONS

| TECHNIQUE | ADVANTAGES | DISADVANTAGES |
|---|---|---|
| | | laser nonlinearity System power margin limited by small laser modulation depth and low receiver sensitivity |

OBJECTS AND ADVANTAGES

A principal object of this invention is to provide a new and improved subcarrier-multiplexed optical amplifier system which has a number of important advantages compared to prior art multi-channel transmission systems. The notable advantages of the invention described herein are summarized in Table II.

TABLE II

ADVANTAGES OF SUBCARRIER-MULTIPLEXED OPTICAL TRANSMISSION SYSTEMS USING OPTICAL CHANNEL SELECTION

| ADVANTAGES OVER MULTICHANNEL COHERENT TRANSMISSION | ADVANTAGES OVER WAVELENGTH DIVISION MULTI-PLEXING | ADVANTAGES OVER SUBCARRIER-MULTIPLEXING WITH ELECTRONIC CHANNEL SELECTION |
|---|---|---|
| Does not require narrow-linewidth lasers. Does not require local oscillator laser in receiver. Allows more than one information channel for each laser transmitter. More tolerant of laser wavelength drift. | Allows narrower channel spacing. Allows more than one information channel for each laser transmitter. | Uses simple baseband receiver with no microwave components. Optical Amplifier yields receiver sensitivity comparable to coherent transmission. Optical amplifier allows small modulation depth for lower signal distortion. |

SUMMARY OF THE INVENTION

In accordance with one aspect of the invention, a subcarrier-multiplexed optical transmission system for providing a direct optical domain-to-baseband conversion of a selected information channel includes an optical transmitter, an optical fiber, and an optical receiver. The optical transmitter includes a high-speed diode laser modulated by a plurality of independent baseband information channels carried on separate, appropriately spaced carrier frequencies, and having an output coupled to the optical fiber. The optical receiver includes a tunable narrow-bandpass semiconductor laser optical amplifier having a gain bandwidth smaller than the distances between adjacent carrier frequencies, polarization controlling means between the fiber and the optical amplifier to maximize the gain of the optical amplifier, and a photodetector coupled to the amplifier output.

In accordance with certain features, the optical amplifier is a single-longitudinal-mode distributed feedback (DFB) semiconductor laser optical amplifier. Alternatively, the optical amplifier can be of the Fabry-Perot type, where the system further includes a blocking filter between the amplifier output and the photodetector for rejecting adjacent spectra belonging to unwanted longitudinal modes. The amplifier is tuned to a selected one of the subcarrier multiplexed information channels so that only the spectrum of the selected channel is presented to the photodetector. The photodetector provides the baseband signal belonging to the selected subcarrier channel.

With another aspect of the invention, a subcarrier-multiplexed optical transmission system for providing a direct optical domain-to-baseband conversion of a selected subcarrier channel includes an optical transmitter, an optical fiber, and an optical receiver. The transmitter includes a high-speed diode laser having an optical carrier corresponding to an unmodulated longitudinal mode thereof. The laser is coupled to be modulated by a number of independent baseband information channels carried on separate, appropriately spaced carrier frequencies. The fiber is coupled to the laser diode output. The receiver includes a wide bandwidth, "traveling wave", optical amplifier. The optical fiber is coupled to the input of the amplifier. The receiver further includes a tunable narrow-band optical filter, coupled to the output of the amplifier, for rejecting the optical carrier corresponding to the unmodulated longitudinal mode of the transmitter laser, a photodetector, and a blocking filter between the narrowband optical filter and the photodetector. The blocking filter prevents spurious signals from reaching the photodetector.

BRIEF DESCRIPTION OF THE DRAWING

Other objects, advantages, and features of this invention, together with its construction and mode of operation, will become more apparent from a reading of the following description, when read in conjunction with the accompanying drawing, in which.

DESCRIPTION OF PREFERRED EMBODIMENTS

Figure 2:
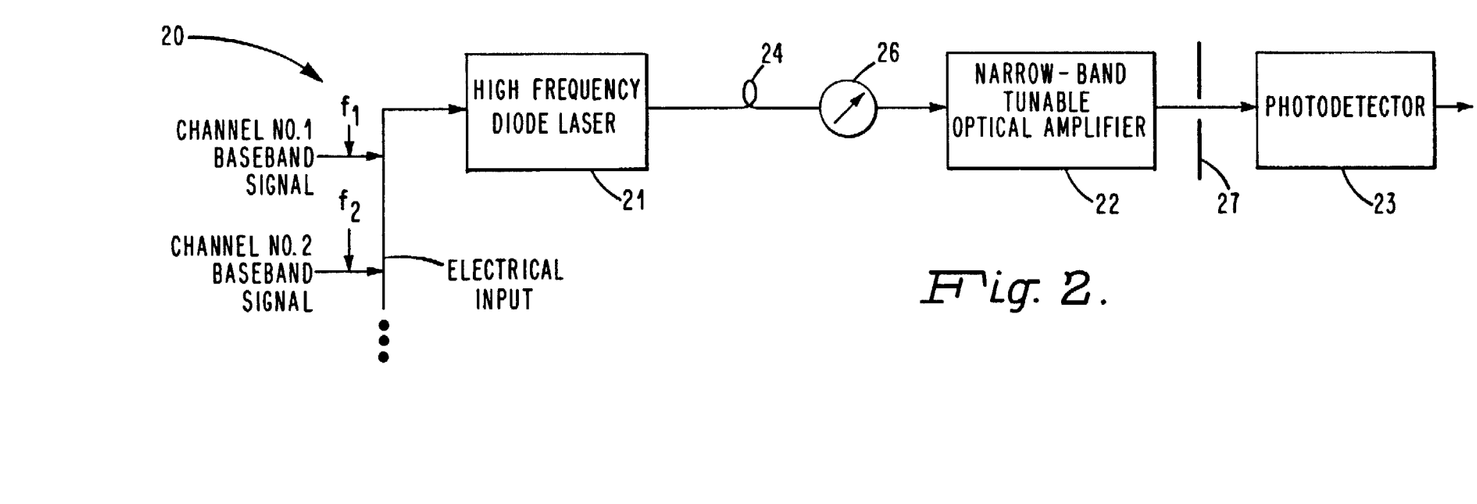
FIG. 2 is a block diagram of a subcarrier-multiplexed optical transmission system using optical channel selection, in accordance with one embodiment of the invention.

One embodiment 20 of the invention is illustrated in FIG. 2. A high-speed diode laser 21 is coupled to be modulated by a number of independent baseband information channels carried on separate, appropriately spaced carrier frequencies. A semiconductor laser optical amplifier is designed and biased to provide narrow-bandpass gain peaks at the transmission wavelengths corresponding to the emitted longitudinal modes. The amplifier may either be Fabry-Perot (Simon, supra), which emits a multiplicity of periodic modes, or DFB (Kawaguchi et al., supra), which emits a single longitudinal mode. The laser amplifiers are tunable to select any one of the subcarrier-multiplexed information channels and reject the spectrums modulating the wavelengths of the unwanted laser longitudinal mode(s). The wavelength of the amplifier 22 gain peak can be tuned to any of the subcarrier channels by varying the amplifier base current and/or temperature, whereby the optical amplifier 22 acts as a wavelength selective element in a subcarrier-multiplexed transmission system 20.

Amplifier passband widths of less than 2 GHz have been demonstrated [Mukai et al], whereby several independent subcarriers can be accommodated by using a laser with a multigigahertz modulation bandwidth. Diode lasers with modulation bandwidths exceeding 18 GHz have been demonstrated [Olshansky et al.], and further improvements are expected to extend modulation bandwidths to greater than 20 GHz. The number of channels that can be transmitted, using a single subcarrier-multiplexed diode laser transmitter, increases with increasing diode laser modulation bandwidth and decreasing optical amplifier passband width.

As the optical amplifier 22 is designed to have a passband which is sufficiently narrow to reject the (unmodulated) laser longitudinal mode wavelengths and the unwanted subcarrier multiplexed channels, the optical signal incident on the photodetector 23 contains baseband information from only the selected channel. Unlike standard subcarrier-multiplexed transmission systems, a high speed photodetector is not needed and the required photodetector bandwidth is the same as that of a simple baseband intensity-modulated transmission system since the selected channel does not mix with the unmodulated longitudinal modes to produce microwave frequency photodetector currents. The optical amplifier 22 can provide over 20 dB of gain, so the receiver sensitivity of the subcarrier-multiplexed system 20 described herein can approach that of a coherent communication system. As shown in FIG. 2, the electrical input to the high frequency diode laser 21 is provided by channel #1 baseband signal at a frequency $f_1'$ by channel #2 baseband signal at a frequency $f_2'$ etc. The output of the diode laser 21 is coupled via an optical fiber link 24, past a polarization controller 26, to the narrowband tunable optical amplifier 22. The output of the amplifier 22 is directed to the photodetector 23, via a blocking filter 27. A representative diagram of the optical emission spectra from a Fabry-Perot diode laser and the spectral characteristics of the optical components in the system 20 are shown in FIG. 3a, 3b, 3c and 3a–d. The function of each system component is detailed below:

1. Subcarrier-Multiplexed Diode Laser Transmitter

Figure 3A:
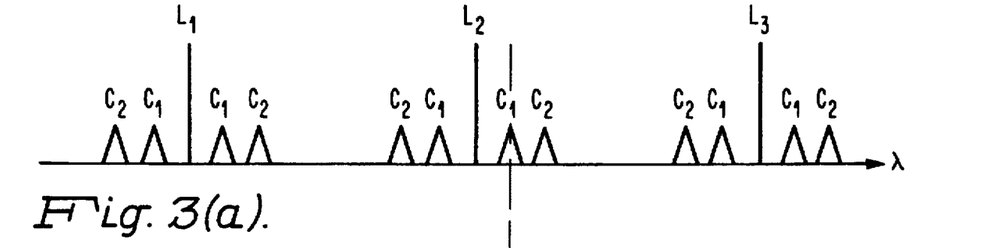
FIGS. 3(a), 3(b), 3(c), and 3(d) illustrate spectral characteristics of optical components in the embodiment shown in FIG. 2, namely, laser, Fabry-Perot amplifier, blocking filter, and photodetector, respectively.

The system 20 requires a diode laser 21 with a multigigahertz modulation bandwidth. Such devices have room-temperature bandwidths approaching 20 GHz. The system 20 operates most efficiently with a laser 21 emitting a single longitudinal mode, such as a distributed feedback laser. Simple Fabry-Perot lasers emitting more than one longitudinal mode can also be used in this system 20. The diode laser 21 is modulated by microwave subcarriers spaced at minimum intervals on the order of 2 GHz. The minimum subcarrier spacing is determined by the selectivity of the tunable optical amplifier 22. Each of the subcarriers is modulated by an independent baseband information signal. The output spectrum from a Fabry-Perot diode laser 21 modulated by the subcarrier-multiplexed spectrum is shown in FIG. 3(a). Each of the laser longitudinal modes has an associated upper and lower sideband corresponding to each of the modulated subcarriers. The number of independently modulated optical subcarriers that can be transmitted by a single diode laser increases with increasing diode laser modulation bandwidth. A DFB laser would have only one longitudinal mode.

2. Polarization Controller

The optical gain and passband wavelength of the optical amplifier 22 change as a function of the polarization of the input light signal. A polarization controller 26 is therefore provided in front of the optical amplifier 22. The polarization controller 26 is used to adjust the polarization of the input signal to maximize gain in the optical amplifier. Several different types of polarization controllers which are suitable for this purpose have been reported [in Lefevre, supra].

3. Narrow-Bandpass Semiconductor Laser Optical Amplifier

The subcarrier-multiplexed optical signal from the diode laser 21 is coupled into the optical fiber 24, which carries the signal to a narrow bandpass wavelength-tunable semiconductor laser optical amplifier 22 at the receiving end of the link. The optical amplifier 22 consists of either a Fabry-Perot or distributed feedback (DFB) semiconductor laser biased by a drive current which does not exceed the lasing threshold current. The drive current is set to be sufficiently high to provide substantial optical gain between the front (input) and rear (output) facets of the amplifier 22. Optical gains of over 20 dB have been demonstrated with Fabry-Perot optical amplifiers [Olssage et al., supra].

Figure 3B:
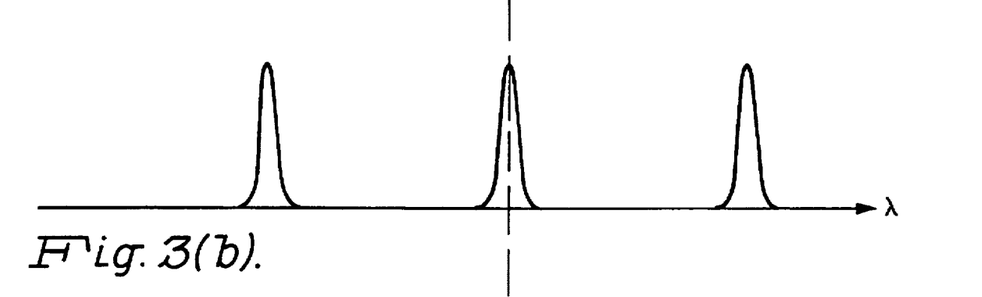

The form of the gain versus wavelength characteristics for a Fabry-Perot optical amplifier is shown in FIG. 3(b). The amplifier 22 exhibits multiple gain peaks spaced at wavelength intervals of $\lambda^2/2nd$, where $\lambda$ is the transmission wavelength, n is the equivalent refractive index of the optical amplifier active layer, and d is the length from the front to the rear facets of the optical amplifier 22. An optical amplifier based on a DFB laser structure exhibits only one gain peak. Increasing the amplifier bias current increases the peak gain while narrowing the gain bandwidth. For a given value of peak optical gain, the gain bandwidth of a Fabry-Perot optical amplifier can be reduced by increasing the length of the amplifier and/or by increasing the reflectivity of the amplifier facets through the application of appropriate dielectric coatings. The spacing between the optical subcarriers transmitted by the laser 21 is greater than the gain bandwidth of the optical amplifier 22. The amplifier 22 drive current, length, and facet reflectivities can be adjusted to yield a gain bandwidth which is less than approximately 2 GHz, so that multiple optical subcarriers can be accommodated by a system 20 which uses a diode laser 21 having a multigigahertz modulation bandwidth.

The wavelength of the optical amplifier 22 gain peak can be readily tuned to correspond to a desired subcarrier wavelength by appropriately changing the amplifier 22 drive current and/or temperature. Changing the drive current changes the carrier density in the active layer, which tunes the amplifier 22 resonance due to the carrier-induced change in the effective refractive index of the amplifier active layer. Both Fabry-Perot and DFB optical amplifiers can be tuned by this method. Kawaguchi et al., supra, conducted a recent experiment with a DFB optical amplifier reported a tuning sensitivity of 4.5 GHz/mA toward shorter wavelength as the amplifier drive current was increased.

Changing the drive current also changes the gain of the amplifier 22. When the amplifier gain remains sufficiently high for operation in the signal-spontaneous beat noise limit, changes in gain do not effect the receiver sensitivity [Fye, supra].

The temperature of the amplifier should be carefully controlled to stabilize the wavelength of the gain peak. The peak gain wavelength of an InGaAsP/InP Fabry-Perot optical amplifier changes by about 0.05 nm/°C. (10 GHz/°C.) at a nominal operating wavelength of 1.3 µm. When the amplifier is designed to have a bandwidth of 1 GHz, the temperature difference between the diode laser transmitter and the optical amplifier is controlled with an accuracy on the order of 0.1° C. Such temperature stability is readily obtained by mounting the diode laser 21 transmitter and optical amplifier 22 in packages that incorporate Peltier effect thermoelectric coolers. Temperature tuning can be used in conjunction with current tuning for channel selection in the subcarrier-multiplexed optical transmission system proposed herein.

4. Blocking Filter

Figure 3C:
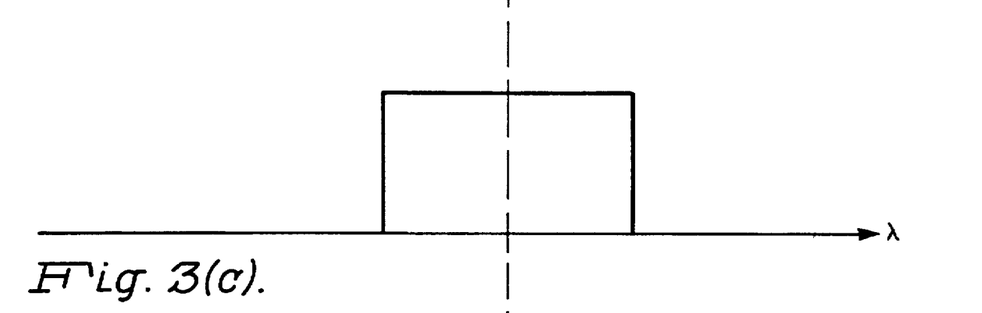

When the optical amplifier 22 is of the Fabry-Perot type, a narrow bandpass optical blocking filter 27 is placed in the optical path between the optical amplifier 22 and the receiver photodetector 23. An idealization of the blocking filter 27 optical characteristics is shown in FIG. 3(c). The blocking filter 27 has a passband which is less than the wavelength spacing between the amplifier Fabry-Perot modes, so that signals amplified by only one of the Fabry-Perot amplifier gain peaks reaches the photodetector 23. By blocking all but one Fabry-Perot mode, the blocking filter 27 reduces the spontaneous-spontaneous beat noise at the receiver [Fye, supra]. When a Fabry-Perot laser is used in the transmitter, the blocking filter 27 also prevents all but one of the transmitter longitudinal modes from being amplified and coupled to the photodetector 23. The blocking filter 27 can be a multilayer dielectric or metal-dielectric interference filter, or it can consist of a suitable diffraction grating configuration. The blocking filter 27 is not required when the optical amplifier 22 is a single-longitudinal-mode DFB laser structure. Note that the gain of the optical amplifier 22 allows significant optical losses to be tolerated in the blocking filter 27 without degrading the receiver signal-to-noise ratio, as discussed in Fye, supra.

5. Photodetector

Figure 3D:
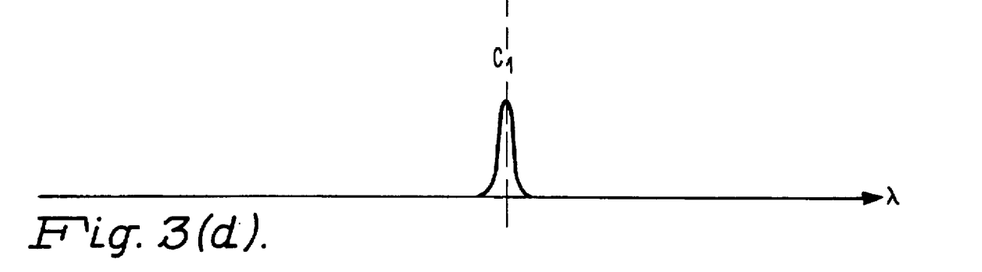

The photodetector 23 used in the optical receiver responds to the optical emission wavelength produced by the transmitter laser 21. An InGaAs/InP PIN photodiode is preferred for a 1.3 or 1.5 µm transmission system using an InGaAsP/InP diode laser transmitter. An important feature of this invention is that the response speed of the photodiode 23 need be no higher than that of the baseband signals that are applied to the microwave subcarriers. As shown in FIG. 3(d), the optical carrier corresponding to the unmodulated longitudinal mode of the laser 21 is rejected by the narrowband optical amplifier 22 and does not mix with the optical subcarriers to produce microwave frequency photodetector currents. This is a significant advantage over previous subcarrier-multiplexed fiber optic transmission systems that require the use of high speed photodiodes having detection bandwidths exceeding the frequency of the highest microwave subcarrier.

6. Receiver

The receiver used in this subcarrier-multiplexed system is a standard baseband receiver identical to that which would be used for a single channel direct detection transmission system. Unlike previously reported subcarrier-multiplexed optical transmission systems [Darcie, supra], the receiver does not require a microwave local oscillator or a series of microwave filters after the photodetector to select one of the subcarrier-multiplexed information channels. Using a simple direct-detection baseband receiver, the gain of the tunable narrowband optical amplifier 22 permits the receiver sensitivity of this subcarrier-multiplexed transmission system to approach that of an amplitude-shift-keyed optical coherent transmission system. The system described herein is simpler than an optical coherent transmission system of the prior art because it does not require narrow-linewidth single-longitudinal mode diode lasers for the optical transmitter and local oscillator laser in the receiver.

Figure 4:
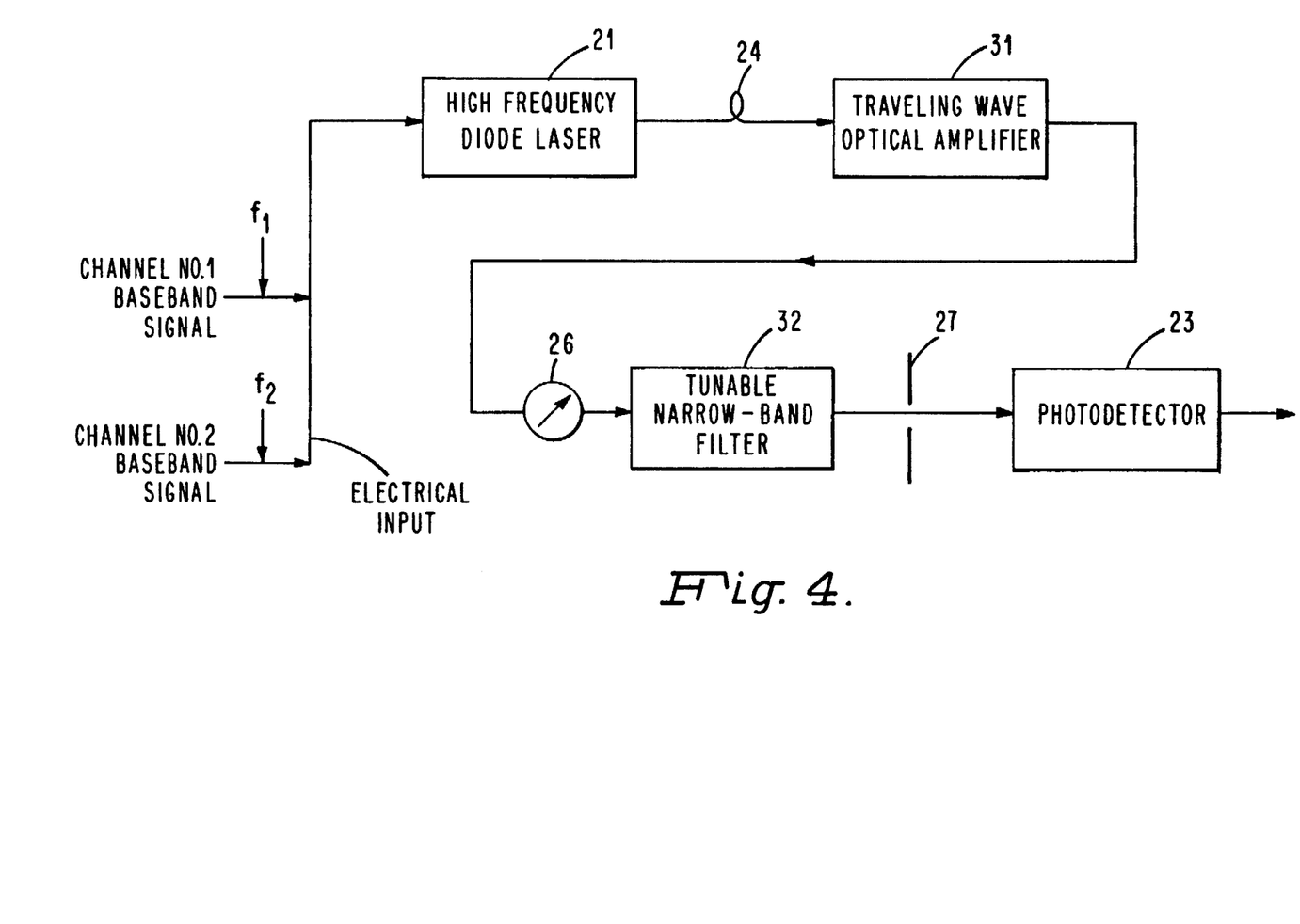
FIG. 4 is a block diagram of a subcarrier-multiplexed optical transmission system using optical channel selection, in accordance with another embodiment of the invention.

A block diagram of the second embodiment of the subcarrier-multiplexed transmission system is shown in FIG. 4. The transmitter, polarization controller 26, photodetector 23 and receiver are of the same type as described above. A wide-bandwidth traveling wave optical amplifier 31 followed by a tunable narrowband optical filter 32 are substituted for the narrow-bandwidth tunable optical amplifier 22 used in the first embodiment. Where the narrowband filtering and gain were provided by the tunable optical amplifier 22 in the system of FIG. 2, these functions are provided by separate components in FIG. 4 so that the wide-bandwidth traveling wave optical amplifier 31 provides the gain and optical filter 32 performs the filtering. A representative diagram of the optical emission spectra from the diode laser and the spectral characteristics of the optical components in the receiver of the second novel system embodiment are shown in FIG. 5, 5a, 5b, 5c, 5d, and 5e. Descriptions of these components are given below.

1. Wide Bandwidth Optical Amplifier

A wide bandwidth (or so-called "traveling wave") optical amplifier 31 amplifies the subcarrier-multiplexed optical signal transmitted by laser 21. The traveling wave optical amplifier 31 is similar in structure to the Fabry-Perot optical amplifier described above, with the exception that dielectric antireflection (AR) coatings are applied to both of the amplifier facets. The AR coatings suppress the Fabry-Perot mode structure of the amplifier gain characteristics so that the amplifier gain (FIG. 5b) is nearly independent of the input signal wavelength. Traveling wave optical amplifiers with AR-coated facets have been fabricated from InGaAsP/ InP diode lasers, and their characteristics are well-suited for this application [Saitoh et al.].

The bias current applied to the optical amplifier 31 is adjusted to yield high optical gain. In this second system embodiment, the amplifier current is fixed and channel selection is accomplished with a separate tunable narrowband optical filter 32 between the amplifier 31 and the detector 23. For best receiver sensitivity, the amplifier 31 gain is set sufficiently high to overcome the optical losses in the narrowband filter 32 so that signal-spontaneous beat noise is reduced. Separating the gain and channel selection functions permits tuning to be accomplished without changing the gain of the optical amplifier 31 or the passband width of the optical filter 32.

The gain of traveling wave optical amplifiers can be made much less sensitive than that of narrowband optical amplifiers to changes in input signal polarization. A polarization controller 26 is necessary only when the characteristics of the narrowband optical filter depend on signal polarization. When a polarization controller is necessary due to the narrowband filter 32 characteristics, placing the polarization controller 26 between the amplifier 31 and the filter 32 has the least impact on the receiver sensitivity.

2. Tunable Narrow-Band Optical Filter

The tunable optical filter 32 has a bandwidth sufficiently narrow to reject the optical carrier corresponding to the unmodulated longitudinal mode of the transmitter laser 21. The tunable filter 32 bandwidth is no wider than about 2 GHz, so that a single laser with a multigigahertz modulation bandwidth can be used to transmit multiple optical subcarriers.

A tunable Fabry-Perot optical filter is suitable for this application. The filter can consist of a Fabry-Perot etalon with mirror spacing that can be tuned by applying a voltage to piezoelectric transducers [Fabry-Perot Interferometers and Etalons manual, supra]. A Fabry-Perot tunable optical filter can also be realized by applying mirrors to a material, such as lithium niobate, which has an index of refraction that varies with applied electric field.

Figure 5A:
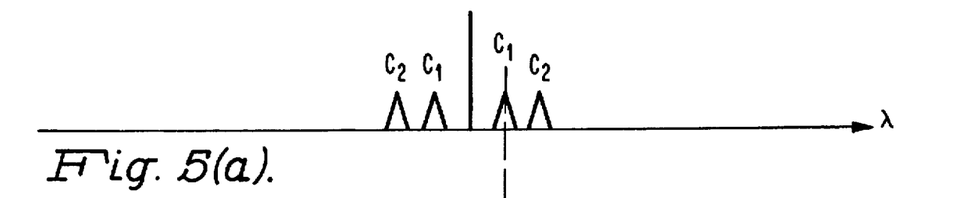
FIGS. 5(a), 5(b), 5(c), 5(d), and 5(e) illustrate spectral characteristics of optical components in the embodiment shown in FIG. 4, namely, laser, traveling wave amplifier, tunable filter, blocking filter, and photodetector, respectively.
Figure 5B:
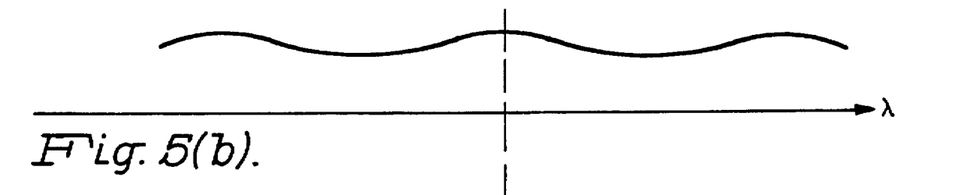
Figure 5C:
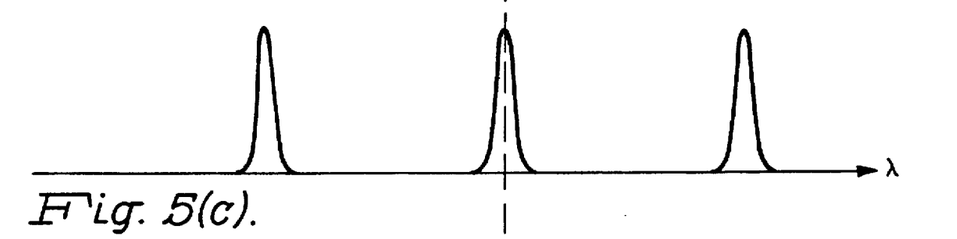

A representation of the Fabry-Perot tunable filter spectral characteristics is shown in FIG. 5(c). In operation, the narrowband filter is tuned so that the passband of one of the longitudinal modes is aligned with one of the microwave subcarriers transmitted by the laser. The filter selects the desired subcarrier and filters out most of the spontaneous emission from the wideband optical amplifier.

3. Blocking Filter

Figure 5D:
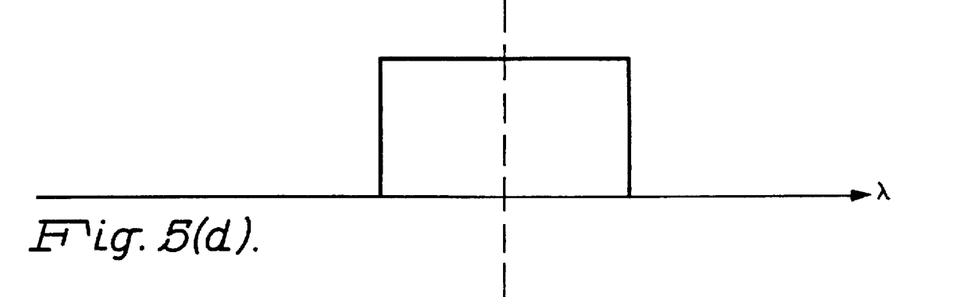
Figure 5E:
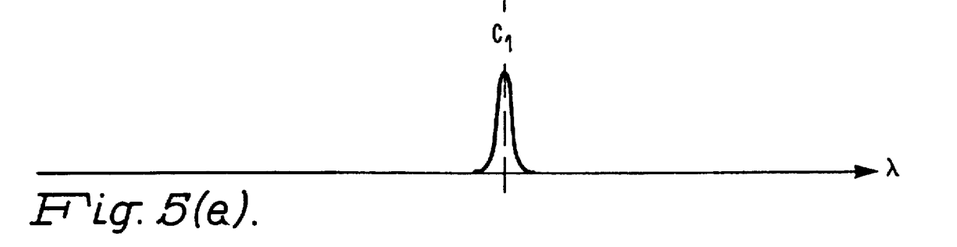

The blocking filter 27 used in this system embodiment has a bandwidth which is less than the spacing between the multiple passbands of the tunable optical filter 32. As represented in FIG. 5(d), the blocking filter 27 prevents spurious signals from reaching the photodetector 23, and filters out spontaneous emission which was not blocked by the tunable optical filter 32.

Various modifications will suggest themselves to those skilled in the art without departing from the spirit and scope of the invention. For example, the following concepts are believed to be expressive of the invention:

1. A microwave subcarrier-multiplexed optical transmission system using a narrow bandwidth tunable optical amplifier as a wavelength-selective element.
2. A microwave subcarrier-multiplexed optical transmission system using a narrow bandwidth tunable distributed feedback semiconductor laser amplifier as a wavelength-selective element.
3. A microwave subcarrier-multiplexed optical transmission system where a plurality of subcarrier-multiplexed information channels are transmitted via a single diode laser, and a narrow bandwidth tunable optical amplifier is used as a wavelength-selective element to select an individual subcarrier-multiplexed information channel.
4. A microwave subcarrier-multiplexed optical transmission system having a narrow bandwidth tunable Fabry-Perot semiconductor laser amplifier as a wavelength-selective element.
5. A microwave subcarrier-multiplexed optical transmission system having a narrow bandwidth tunable optical amplifier as a wavelength-selective element, where the narrowband optical amplifier is electrically or thermally tuned to amplify a single modulated microwave subcarrier while blocking all others.
6. A subcarrier-multiplexed optical transmission system using a narrow bandwidth tunable optical amplifier as a wavelength-selective element where the narrowband optical amplifier converts a modulated microwave subcarrier to a baseband signal at an optical detector.
7. A microwave subcarrier-multiplexed optical transmission system having a wideband traveling wave semiconductor laser amplifier coupled to a tunable narrowband optical filter as a wavelength-selective element.
8. A microwave subcarrier-multiplexed optical transmission system having a plurality of subcarrier-multiplexed information channels transmitted with a single diode laser, and where a wideband traveling wave semiconductor laser amplifier is coupled to a tunable narrowband filter as a wavelength-selective element to select an individual subcarrier-multiplexed information channel.
9. A microwave subcarrier-multiplexed optical transmission system having a wideband traveling wave semiconductor laser amplifier coupled to a tunable narrowband optical filter as a wavelength-selective element, where the narrowband optical filter is electrically or thermally tuned to select a single modulated microwave subcarrier while blocking all others.
10. A microwave subcarrier-multiplexed optical transmission system using a wideband traveling wave semiconductor laser amplifier coupled to a tunable narrowband optical filter as a wavelength-selective element, where the narrowband optical filter converts a modulated microwave subcarrier to a baseband signal at an optical detector.

What is claimed is:

1. A subcarrier-multiplexed optical transmission system comprising an optical transmitter comprising
a high-speed diode laser having an optical carrier corresponding to an unmodulated longitudinal mode thereof, coupled to be modulated by a number of independent baseband information channels carried on separate, appropriately spaced subcarrier frequencies to form a subcarrier-multiplexed signal, and having an output therefrom;

an optical fiber coupled to said output of said diode laser;

an optical receiver providing a direct optical domain-to-baseband frequency conversion of a selected subcarrier-multiplexed optical channel comprising
a wide bandwidth, "traveling wave", optical amplifier having an input coupled to said optical fiber, said amplifier having an output;
a tunable narrow-band optical filter, coupled to said output of said amplifier, having a bandwidth smaller than wavelength distances between adjacent ones of said subcarrier frequencies and capable of rejecting the optical carrier corresponding to said unmodulated longitudinal mode of said transmitter laser;

a photodetector having an output; and a blocking filter between said narrow-band optical filter and said photodetector for preventing spurious signals from reaching said photodetector; whereby said optical filter being tuned to said selected optical channel so that only the baseband signal present in said selected optical channel appears at said photodetector output.

2. In an optical transmission system comprising an optical transmitter having a high-speed diode laser emitting an optical carrier corresponding to a single longitudinal mode which is coupled to be modulated by a plurality of baseband information channels carried on separate, appropriately spaced subcarrier frequencies to form a subcarrier-multiplexed signal, an optical fiber for carrying the subcarrier-multiplexed optical signal transmitted by said diode laser, and an optical receiver coupled to said fiber for receiving said subcarrier-multiplexed optical signal, a method of detecting a selected one of said information channels at said receiver, comprising the steps of:

wideband amplification of said subcarrier-multiplexed (SCM) optical signal by applying said SCM optical signal to a wide bandwidth, "traveling wave," optical amplifier having an amplifier gain characteristic nearly independent of input signal wavelength;

coupling the amplified optical signal from said optical amplifier to a narrow-bandwidth optical filter;

tuning said narrow-bandwidth optical filter to said selected subcarrier-multiplexed optical channel so that only said selected optical channel appears at an output of said optical filter; and photodetecting the output of said optical filter;

whereby said selected optical channel experiences a direct frequency conversion from the optical domain to a baseband level.

* * * * *